(12) United States Patent
Muijzert et al.

(10) Patent No.: US 10,605,599 B2
(45) Date of Patent: Mar. 31, 2020

(54) GRADIENT SENSOR DEVICE

(71) Applicant: WESTERNGECO LLC, Houston, TX (US)

(72) Inventors: Everhard Johan Muijzert, Cambridge (GB); Pascal Guillaume Edme, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 126 days.

(21) Appl. No.: 15/517,842

(22) PCT Filed: Oct. 1, 2015

(86) PCT No.: PCT/US2015/053388
§ 371 (c)(1),
(2) Date: Apr. 7, 2017

(87) PCT Pub. No.: WO2016/057293
PCT Pub. Date: Apr. 14, 2016

(65) Prior Publication Data
US 2017/0241781 A1    Aug. 24, 2017

(30) Foreign Application Priority Data
Oct. 8, 2014  (GB) .................... 1417797.6

(51) Int. Cl.
*G01C 9/02*    (2006.01)
*G01V 1/38*    (2006.01)
(Continued)

(52) U.S. Cl.
CPC ............. *G01C 9/02* (2013.01); *G01V 1/184* (2013.01); *G01V 1/20* (2013.01); *G01V 1/3808* (2013.01);
(Continued)

(58) Field of Classification Search
CPC . G01C 9/02; G01V 1/184; G01V 1/20; G01V 1/3808; G01V 1/3835; G01V 1/166;
(Continued)

(56) References Cited

U.S. PATENT DOCUMENTS 4,611,312 A    9/1986  Ikeda
5,231,252 A    7/1993  Sansone
(Continued)

FOREIGN PATENT DOCUMENTS

GB    2358469 A    7/2001
GB    2479200 A    10/2011
(Continued)

OTHER PUBLICATIONS

Lin, C.-J. et al, "Investigation of array-derived rotation in Taipei 101", Journal of Seismology, Kluwer Academic Publishers, DO, 2012, 16(4), pp. 721-731.
(Continued)

*Primary Examiner* — Manuel L Barbee

(57) ABSTRACT

A gradient sensor device includes a support structure providing a surface, and at least three particle motion sensors coupled with and/or arranged on the support structure to measure translational data in a first direction. The particle motion sensors have an arrangement that enables calculation of a spatial gradient of the translational data in a second direction different from the first direction.

16 Claims, 3 Drawing Sheets

(51) Int. Cl.
*H04Q 9/00* (2006.01)
*G01V 1/20* (2006.01)
*G01V 1/18* (2006.01)
*G01V 1/16* (2006.01)

(52) U.S. Cl.
CPC ............ *G01V 1/3835* (2013.01); *H04Q 9/00* (2013.01); *G01V 1/166* (2013.01); *H04Q 2209/30* (2013.01); *H04Q 2209/40* (2013.01)

(58) Field of Classification Search
CPC ... H04Q 9/00; H04Q 2209/30; H04Q 2209/40
See application file for complete search history.

(56) References Cited

U.S. PATENT DOCUMENTS

| | | | |
|---|---|---|---|
| 6,791,901 | B1 | 9/2004 | Robertsson et al. |
| 7,492,665 | B2 | 2/2009 | Robertsson et al. |
| 7,876,642 | B2 | 1/2011 | Robertsson et al. |
| 9,081,111 | B2 | 7/2015 | Amundsen et al. |
| 9,304,216 | B2 | 4/2016 | Muijzert |
| 9,594,174 | B2 | 3/2017 | Goujon et al. |
| 9,651,691 | B2 | 5/2017 | Edme et al. |
| 2001/0030907 | A1 | 10/2001 | Bachrach |
| 2003/0076741 | A1 | 4/2003 | Robertsson et al. |
| 2003/0117894 | A1 | 6/2003 | Curtis et al. |
| 2004/0141355 | A1 | 7/2004 | Robertsson et al. |
| 2005/0259516 | A1 | 11/2005 | Ray et al. |
| 2010/0195439 | A1 | 8/2010 | Muyzert |
| 2010/0274489 | A1 | 10/2010 | Horne |
| 2011/0305112 | A1 | 12/2011 | Liao |
| 2012/0026834 | A1 | 2/2012 | Muyzert et al. |
| 2012/0169352 | A1 | 7/2012 | Helwig |
| 2013/0088939 | A1 | 4/2013 | Edme et al. |
| 2013/0211727 | A1 | 8/2013 | Brune |
| 2013/0315036 | A1* | 11/2013 | Paulson ............... G01V 1/184 367/153 |
| 2014/0219053 | A1 | 8/2014 | Goujon et al. |
| 2014/0219055 | A1* | 8/2014 | Goujon ............... G01V 1/162 367/56 |
| 2014/0288837 | A1 | 9/2014 | Edme et al. |

FOREIGN PATENT DOCUMENTS

| | | |
|---|---|---|
| WO | WO2010090949 A3 | 8/2010 |
| WO | WO/2014110496 A1 | 7/2014 |
| WO | WO/2014120932 A1 | 8/2014 |
| WO | WO/2014153309 A1 | 9/2014 |

OTHER PUBLICATIONS

Fokkema, J. T. et al., "Seismic Applications of Acoustic Reciprocity", Elsevier, Amsterdam, 1993, 352 pages.
Bagaini et al., "Acquisition and processing of simultaneous vibroseis data," Geophysical Prospecting, 2010, vol. 58, pp. 81-99.
Broggini et al., "The contribution of the spatial derivatives to surface-wave interferometry," SEG San Antonio Annual Meeting, 2011, pp. 3804-3808.
Vassallo et al., "Crossline wavefield reconstruction from multicomponent streamer data: Part 1—Multichannel Interpolation by marching pursuit (MIMAP) using pressure and its crossline graident," Geophysics, Nov.-Dec. 2010, vol. 75(6), pp. WB53-WB67.
Combined Search and Exam Report under Sections 17 and 18(3) in UK Patent Application No. 1417797.6, dated Dec. 18, 2014, 12 pages.
International Preliminary Report on Patentability of International Patent Application No. PCT/US2015/053388, dated Apr. 20, 2017, 13 pages.
Search Report of European Patent Application No. 15848932.8, dated May 8, 2018, 8 pages.
International Search Report of PCT Application No. PCT/IB2013/052638, dated Jul. 18, 2013, 5 pages.
Exam Report of GCC Patent Application No. 2013/24015, dated Mar. 21, 2017, 5 pages.
International Preliminary Report on Patentability of International Patent Application No. PCT/IB2013/052638, dated Oct. 16, 2014, 9 pages.
International Written Opinion of International Patent Application No. PCT/IB2013/052638, dated Jul. 18, 2013, 8 pages.
First Exam Report of Australia Patent Application No. 2013245302, dated Dec. 2, 2015, 3 pages.
Substantial Examination of Mexican Patent Application No. MX/a/2014/011894, dated Jul. 6, 2016, 7 pages.
Office Action of U.S. Appl. No. 14/390,377, dated Jun. 30, 2016, 22 pages.
Examination Report under Sections 17 and 18(3) of UK Patent Application No. 1417797.6 dated Sep. 1, 2017, 2 pages.

* cited by examiner

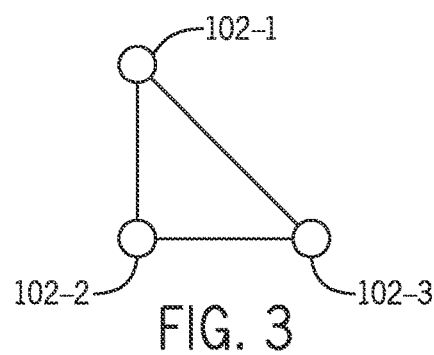
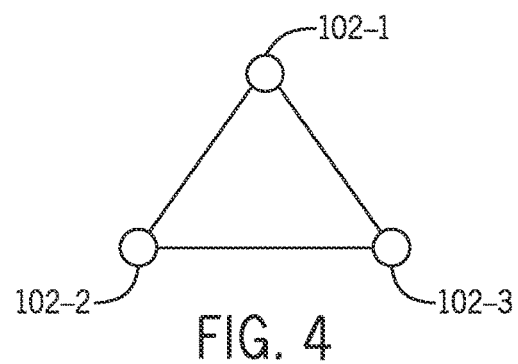
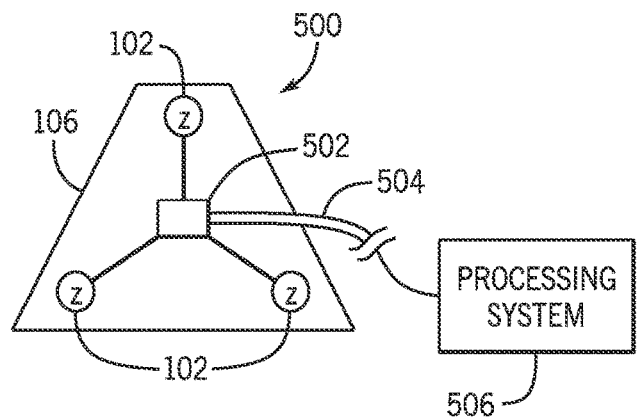
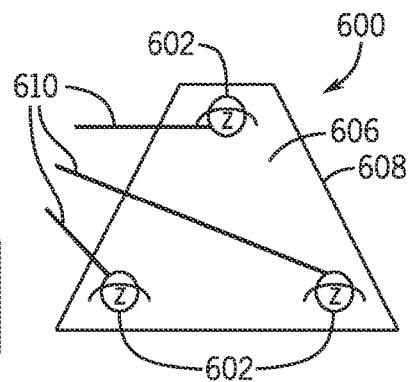
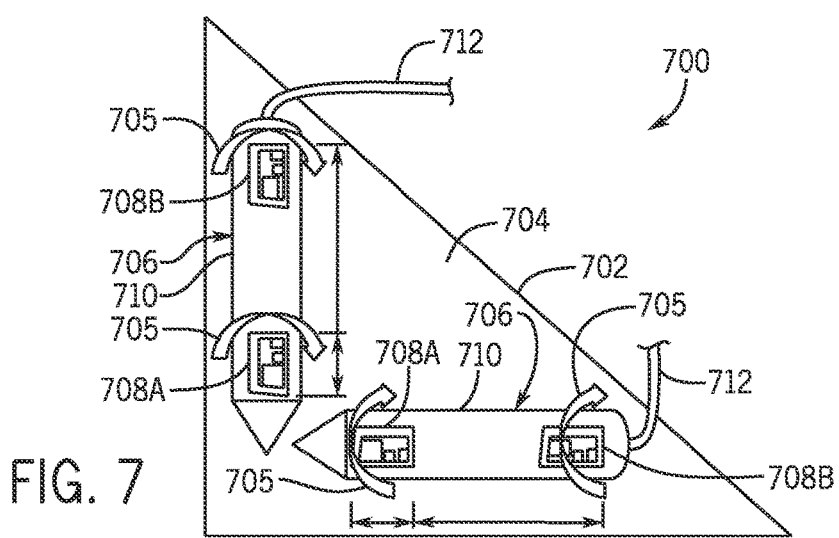

GRADIENT SENSOR DEVICE

BACKGROUND

Seismic surveying is used for identifying subterranean elements of interest, such as hydrocarbon reservoirs, freshwater aquifers, gas injection zones, and so forth. In seismic surveying, seismic sources are activated to generate seismic waves directed into a subsurface structure.

The seismic waves generated by a seismic source travel into the subsurface structure, with a portion of the seismic waves reflected back to the surface where the reflected waves are received/recorded by seismic sensors (e.g. geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor or other water bottom surface.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth.

In general, according to some implementations, a gradient sensor device includes a support structure providing a surface, and at least three particle motion sensors arranged on the support structure to measure translational data in a first direction. The particle motion sensors have an arrangement that enables calculation of a spatial gradient of the translational data in a second direction different from the first direction. In some embodiments, the gradient sensor provides a compact/single unit from which the spatial gradient can be determined that may be used as a node in a seismic survey.

Other of additional features will become apparent from the following description, from the drawings, and from the claims.

BRIEF DESCRIPTION OF THE DRAWINGS

The present disclosure is described in conjunction with the appended figures. It is emphasized that, in accordance with the standard practice in the industry, various features are not drawn to scale. In fact, the dimensions of the various features may be arbitrarily increased or reduced for clarity of discussion.

FIGS. 3 and 4 are schematic diagrams of triangular arrangements of particle motion sensors, in sensor devices according to some examples.

FIGS. 5-7 are schematic diagrams of gradient sensor devices according to further implementations.

Figure 1:
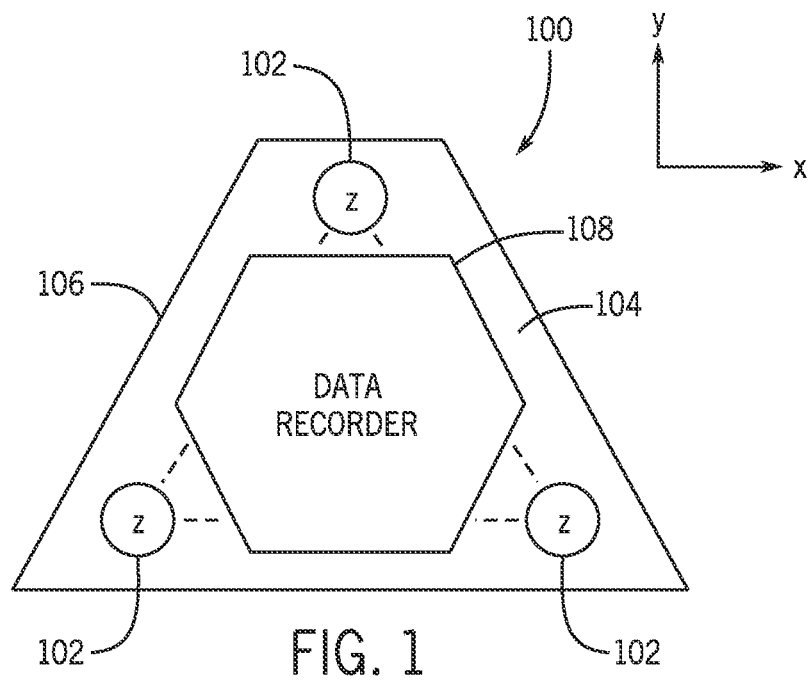
FIGS. 1 and 2 are schematic diagrams of a sensor device including an arrangement of particle motion sensors, according to various implementations.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors (e.g. MEMS accelerometers), or any other type of sensors that measure translational motion of the surface in one or more directions. A MEMS sensor includes elements with sizes in the nanometers or micrometers range. One or more of the elements of the MEMS sensor may be movable.

In the ensuing discussion, a seismic sensor that measures translational motion is referred to as a particle motion sensor. A particle motion sensor can refer to any of the sensors listed above.

An arrangement of particle motion sensors can be provided at (or proximate) an earth surface (land surface or bottom surface of a body of water, such as a seafloor) to measure seismic waves reflected from a subsurface structure, in response to seismic waves (or impulses) produced by one or more seismic sources and propagated into an earth subsurface. A seismic source can include an air gun, a vibrator, an explosive, or any other source that is able to produce acoustic energy.

A particle motion sensor provided at a ground surface can refer to a particle motion sensor that is placed in contact with the ground surface, partially buried in the ground surface, or completely buried in the ground surface up to a predetermined depth (e.g. up to a depth of less than 5 meters). A particle motion sensor at (or proximate) the earth surface can record the vectorial part of an elastic wavefield just below the free surface (i.e. ground surface).

A particle motion sensor can measure translational data along a given direction. In some examples, a particle motion sensor can include multiple sensing elements that measure translational data in multiple different directions.

In some cases, it may be beneficial to obtain a spatial gradient of translational data. For example, the spatial gradient of the translational data can be used in a process for performing noise attenuation of measured seismic data, to remove or reduce noise in the measured seismic data. In other examples, the spatial gradient of translational data can be used in other types of processes.

A spatial gradient of translational data refers to a spatial derivative of the translational data with respect to a given axis. For example, a particle motion sensor can measure translational data along a vertical axis (e.g. z axis). A gradient of the vertical translational data can be calculated by taking a spatial derivative of the vertical translational data with respect to a horizontal axis (e.g. x or y axis, where the x axis is generally perpendicular to the y axis, and both the x and y axes are generally perpendicular to the z axis).

The spatial gradient of translational data can be approximated by using measurements of closely spaced apart particle motion sensors. For example, particle motion sensors for measuring vertical translational data can be spaced apart by an offset that is less than a quarter of a wavelength of signals of interest to be measured by the particle motion sensors (more specific examples are discussed further below).

FIG. 1 is a schematic diagram of a sensor device 100 that has an arrangement of three particle motion sensors 102 that measure translational data (e.g. displacement, velocity, or acceleration) along the z axis, which can be the vertical axis. In some examples, the particle motion sensors 102 are MEMS accelerometers. In other examples, the particle motion sensors 102 can include other types of sensors. Although three particle motion sensors 102 are shown in FIG. 1, it is noted that in other examples, more than three particle motion sensors can be included in the sensor device 100.

The particle motion sensors 102 are arranged on a surface 104 provided by a support structure 106. The surface 104 on which the particle motion sensors 102 are arranged can be within a plane defined by the x and y axes. Placing the particle motion sensors on a common support structure (106) of a single sensor device allows for more accurate placement of the particle motion sensors, such that the effect of perturbations and noise can be reduced. Manufacturing processes can allow for the positioning of the particle motion sensors 102 to within a millimeter of a target position, and an orientation to within 1° of a target orientation.

In the example of FIG. 1, the particle motion sensors 102 are provided at respective positions on the surface 104 of the support structure 106. The positions of the particle motion sensors 102 form corners of a triangle, to provide a triangular arrangement.

To accommodate the particle motion sensors 102 in this triangular arrangement, the support structure 106 can have a generally triangular shape. Although FIG. 1 depicts one particle motion sensor 102 at each corner of a triangle, it is note that in other examples, more than one particle motion sensor 102 can be provided at each corner of the triangle. In further examples, the support structure 106 can have other shapes. More generally, the shape of the support structure 106 and the shape of the housing 202 of the sensor device 100 do not have to be constrained to the layout of the particle motion sensors 102.

The particle motion sensors 102 have an arrangement that enables the calculation of a spatial gradient of the translational data (in the z axis) measured by the particle motion sensors with respect to the x axis and/or y axis. In other words, a horizontal gradient of the vertical translational data can be computed. More generally, the particle motion sensors measure translational data in a first direction, and the particle motion sensors 102 have an arrangement that enables calculation of a spatial gradient of the translational data in a second direction different from the first direction, where the second direction is generally perpendicular to the first direction.

In some examples, to enable the calculation of a spatial gradient of translational data as discussed above, the spacing between each pair of particle motion sensors 102 in the sensor device 100 can be less than 25% of the wavelength of a signal of interest (e.g. a seismic signal to be measured by each particle motion sensor 102). In other examples, the spacing between the particle motion sensors 102 can be less than 10% of the wavelength of interest, which can allow for a reduction of the size of the sensor device 100. In further examples, the spacing between particle motion sensors 102 can be less than 1% of the wavelength of interest. In some examples, the spacing between a pair of particle motion sensors 102 in practice can be between 5 centimeters and 30 centimeters.

Figure 2:
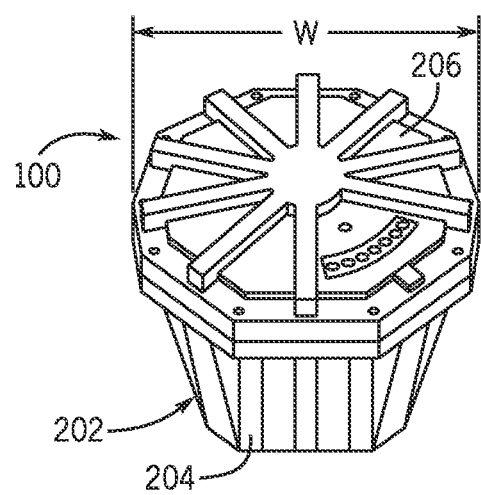

FIG. 2 shows an outer housing 202 of the sensor device 100. The outer housing 202 includes a main body housing segment 204 and a lid 206, which can be attached to the main body housing segment 204 once the arrangement of particle motion sensors 102 shown in FIG. 1 has been placed inside an inner chamber of the outer housing 202. The support structure 106 holding the particle motion sensors 102 can be mounted inside the inner chamber of the outer housing 202.

By reducing the spacing between each pair of particle motion sensors 102 of the sensor device 100, the overall size of the sensor device 100 can be reduced. In some examples, W can be 50 centimeters or less.

FIG. 1 further depicts a data recorder 108 that is part of the sensor device 100. The data recorder 108 includes a data storage medium (e.g. non-volatile solid state memory or a disk-based storage device) that is able to store data measured by the particle motion sensors 102. The data recorder 108 can include electronic circuitry to receive the measured data from the particle motion sensors 102, and to write the received data to the data storage medium.

Although the data recorder 108 is shown as being on the support surface 104 in FIG. 1, it is noted that the data recorder 108 can be provided at a different location within the sensor device 100 in other examples.

Inclusion of the data recorder 108 allows for the sensor device 100 to be an autonomous sensor device. An autonomous sensor device does not have to communicate with a remote system, either over a cable or wirelessly. Rather, the data recorder 108 can be used to record measurements made by the particle motion sensors 102. At a later time, the stored data can be retrieved from the data recorder 108 for processing, either by: (1) removing the data recorder 108 from the sensor device 100 and connecting the data recorder 108 to a processing system, or (2) by moving the sensor device 100 within a proximity of the processing system to allow the sensor device to be connected (either using a cable or wirelessly) to the processing system.

In further examples, although not shown, the sensor device 100 can include a battery and a time clock, which can be synchronized to a global positioning system (GPS) receiver and the sensor device 100. The battery provides power to the data recorder 108 and the particle motion sensors 102, while the time clock provides a time that can be associated with recorded data (e.g. the time at which data was recorded).

The spatial gradient of translational data (e.g. velocity Vz along the z axis) measured by the particle motion sensors 102 can be computed as follows. For three particle motion sensors 102 positioned at the corners of a right angle triangle (such as in the arrangement of FIG. 3), the spatial gradients of Vz with respect to the x and y axes are given by:

$$\frac{dVz}{dx} = \frac{Vz(1) - Vz(2)}{d12}, \frac{dVz}{dy} = \frac{Vz(3) - Vz(2)}{d32}.$$

where d12 is the distance between the a first particle motion sensor 102-1 (that measured Vz(1)) and a second particle motion sensor 102-2 (that measured Vz(2)), d32 is the distance between the second particle motion sensor 102-2 and a third particle motion sensor 102-3 (that measured Vz(3)). In this example, the data from the second particle motion sensor 102-2 (right angle corner of the triangle) is used for the calculation of both gradients. In other examples, for accelerometers positioned around an equilateral triangle (such as in the arrangement of FIG. 4, which is similar to the arrangement of FIG. 1), the spatial gradients of Vz with respect to the x and y axes are obtained by:

$$\frac{dVz}{dx} = \frac{Vz(1) - Vz(2)}{d12}, \frac{dVz}{dy} = \frac{Vz(3) - (Vz(2) + Vz(1))/2}{d32},$$

where data, Vz(1) and Vz(2), from the first and second particle motions sensors 102-1 and 102-2 are used in the calculation of both gradients $$\frac{dVz}{dx} \text{ and } \frac{dVz}{dy}.$$

In other examples, instead of the triangular arrangements depicted in FIGS. 3 and 4, other triangular arrangements of particle motion sensors 102 (at positions that form a triangle) can be used, as long as the relative positions of the particle motion sensors 102 are known.

FIG. 5 is a schematic diagram of an example gradient sensor device 500 according to different implementations. The gradient sensor device 500 includes a communication component 502, in place of the data recorder 108 of FIG. 1. The particle motion sensors 102 are connected to the communication component 502. In the example of FIG. 5, the communication component 502 is connected to a cable 504, such as an electrical cable or an optical cable. The communication component 502 can communicate over the cable 504 with a remote processing system 506 (which is remote from and separate from the gradient sensor device 500). The remote system 506 can be a computer system, for example.

The cable 504 can be used to deliver power and command signals to the gradient sensor device 500. As a result, the gradient sensor device 500 can be provided without a battery. Also, a GPS receiver can be omitted.

In other examples, the communication component 502 can be a wireless communication component to communicate wirelessly with the remote system 506, such as using radio frequency (RF) communications, infrared (IR) communications, and so forth. Various communication protocols can be used for communications over the cable 504 or a wireless link.

In further examples, the gradient sensor device 500 can include both the communication component 502 and the data recorder 108.

As noted above, the particle motion sensors 102 of a gradient sensor device (e.g. 100 and 500) can include MEMS accelerometers. In other examples, instead of using MEMS accelerometers, the particle motion sensors 102 can be implemented with geophones or non-MEMS accelerometers. For example, FIG. 6 shows a gradient sensor device 600 that includes geophones 602. The geophones 602 are clamped by attachment elements 604 (clamping mechanisms, screws, etc.) to a surface 606 of a support structure 608. The geophones 602 are connected by cables 610 (electrical cables or optical cables) to a communication component or a data recorder, or both. In some examples, the support structure 608 on which geophones 602 are mounted can be in the form of a plate, such as a metal plate.

The plate 608 can include holders at predetermined positions to receive the geophones 602, which allow for more accurate placement of the geophones 602.

FIG. 7 illustrates a gradient sensor device 700 according to further examples. The gradient sensor device 700 includes a support structure 702 (e.g. a plate) providing a surface 704 on which are mounted elongated sensing devices 706. The elongated sensing devices 706 are attached to the support structure 702 by attachment elements 705.

The elongated sensing device 706 includes a first sensor component 708A and a second sensor component 708B. The sensor components 708A and 708B are included inside a single housing 710 of the elongated sensing device 706. The elongated sensing device 706 can also include a power source, such as a battery, and so forth. In manufacturing the elongated sensing device 706, the housing 710 can be sealed to protect the sensor components 708A and 708B. The housing 710 can be made out of a material, such as plastic, metal, and so forth.

The housing 710 generally has an elongated shape that allows the sensor components 708A and 708B to be spaced apart along a longitudinal axis of the elongated sensing device 706. In some examples, the sensor components 708A and 708B are co-axial along the longitudinal axis of the housing 710. The elongated housing 710 can be in the form of a hollow tube, stick, or other elongated structure. The longitudinal axis is the axis along a dimension of the elongated sensing device 706 which is longer than other dimensions of the elongated sensing device 706, such as a width dimension or a depth dimension that corresponds to a thickness of the housing 710.

The elongated sensing device 706 having the elongated housing 710 can be referred to as a spike-shaped sensor device.

Each elongated sensing device 706 can include a communication interface circuit, which is connected to a respective cable 712 communications medium 103 (e.g. electrical cable, fiber optic cable, etc.). Data acquired by the sensor components 708A and 708B are transferred to the communication interface circuit, which in turn transmits the acquired data over the cable 712 to a remote system, or to a local data recorder.

In some examples, the sensor components 708A and 708B can be implemented with sensor chips. A sensor chip refers to an integrated circuit device that includes a substrate (e.g., semiconductor substrate) on which particle motion sensors can be provided. For example, the particle motion sensors that can be provided in the sensor chip 708A or 708B can include MEMS particle motion sensors, such as MEMS accelerometers.

In the arrangement of FIG. 7, a first pair of particle motion sensors are arranged along a line that is generally orthogonal to a line along which a second pair of particle motion sensors are arranged.

Figure 8:
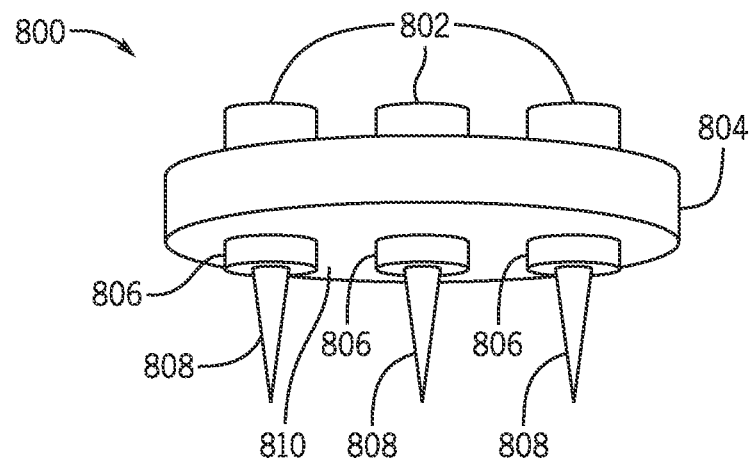
FIG. 8 is a schematic diagram of a gradient sensor device including coupling enhancing pads according to further implementations.

FIG. 8 is a schematic diagram of a side view of a gradient sensor device 800 according to further examples. The gradient sensor device 800 includes particle motion sensors 802 mounted on a support structure 804. In addition, coupling enhancing pads 806 (which can be formed of metal or another material) depend from a bottom surface 810 of the support structure 804. Spikes 808 can depend from respective coupling enhancing pads 806, where the spikes 808 for insertion into an earth surface, such as a land surface or a seafloor. In some examples, the coupling enhancing pads 806 are located directly underneath the respective particle motion sensors 802, to enhance the coupling to the respective particle motion sensors 802. The coupling enhancing pads 806 can make contact with an earth surface even on an uneven earth surface, to enhance coupling between the sensor device 800 and the earth surface.

Figure 9:
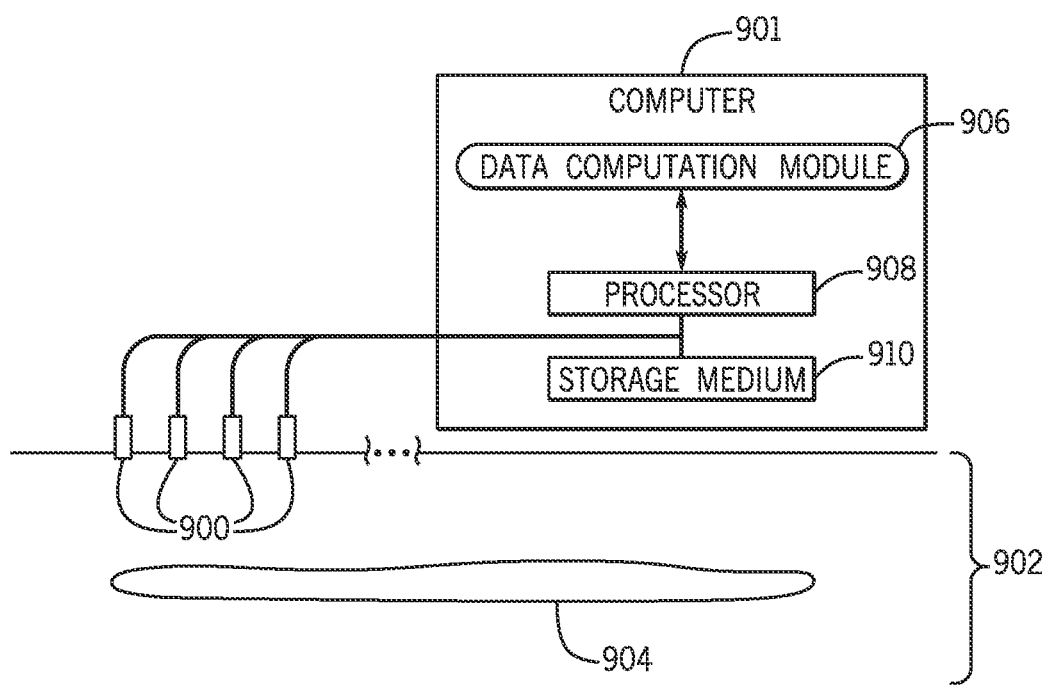
FIG. 9 is a schematic diagram of an example survey arrangement including sensor devices according to some implementations.

FIG. 9 is a schematic diagram of a land-based survey arrangement that includes sensor devices 900 according to some implementations. The sensor devices 900 can include gradient sensor devices as discussed above. In different examples, the sensor devices 900 can be deployed in a marine survey arrangement. Although FIG. 9 depicts a wired system, it is noted that in other examples, the sensor devices 900 can communicate wirelessly.

Measurements acquired by the sensor devices 900 are transmitted to a computer 901 (wired or wireless communications), where the measurements are recorded (stored in a storage medium or storage media 910). In other examples, the measurements by the sensor devices 900 can be stored in memory inside the sensor devices 900, and the stored measurement data can be later retrieved, such as by using wireless communications or placing the sensor devices 900 on a rack or other structure that allows connection of the sensor devices 900 to a system that is able to retrieve the measurement data. The measurements are made by the sensor devices 100 in response to seismic waves produced by one or more seismic sources (not shown). The seismic waves are propagated into a subsurface structure 902, and reflected from a subsurface element 904 of interest. The reflected waves are detected by the sensor devices 900.

The computer 901 includes a data computation module 906, which can be implemented with machine-readable instructions that are executable on one or more processors 908. The data computation module 906 can compute spatial gradients of translational data measured by the sensor devices 900, as discussed above.

The processor(s) 908 can be coupled to the storage medium (or storage media) 910, which can store data, such as translational data received from the sensor devices 900.

The storage medium (or storage media) 610 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

While the principles of the disclosure have been described above in connection with specific apparatuses and methods, it is to be clearly understood that this description is made only by way of example and not as limitation on the scope of the invention.

What is claimed is:

1. A system comprising:
a plurality of sensor devices, wherein a given one of the sensor devices comprises:
a support structure providing a surface; and
at least three particle motion sensors coupled with the support structure to measure translational data in a first direction, the particle motion sensors are arranged at positions which form corners of a triangle and enable calculation of spatial gradients of the translational data in second and third directions, both of which are perpendicular to the first direction and to each other; and
a computer configured to:
receive the measured translational data from the at least three particle motion sensors; and
compute from the measured translational data the spatial gradients of the translational data in the second and third directions which are perpendicular to the first direction and to each other.

2. The system of claim 1, wherein the first direction is a vertical direction, and the second direction is a horizontal direction.

3. The system of claim 1, further comprising:
a recorder to record the measured translational data by the particle motion sensors for subsequent retrieval by a processing system.

4. The system of claim 1, wherein the particle motion sensors are arranged at positions on the surface.

5. The system of claim 1, further comprising a communication component to communicate the measured translational data to a remote system.

6. The system of claim 5, wherein the communication component is configured to communicate wirelessly with the remote system, or to communicate over a cable with the remote system.

7. The system of claim 1, wherein the support structure includes a plate that provides the surface on which the particle motion sensors are attached.

8. The system of claim 1, further comprising elongated sensing devices, each of the elongated sensing devices including at least two particle motion sensors, where the at least two particle motion sensors within each of the elongated sensing devices are spaced apart along a longitudinal direction of the respective elongated sensing device within a housing of the elongated sensing device, and where each elongated sensing device has a length longer than a width of the elongated sensing device.

9. The system of claim 1, further comprising coupling enhancing pads configured to depend from the support structure, the coupling enhancing pads to engage with an earth surface.

10. The system of claim 1, wherein a spacing between a pair of the particle motion sensors is less than about 10% of a wavelength of a signal of interest to be measured by the particle motion sensors.

11. The system of claim 1, wherein a spacing between a pair of the particle motion sensors is less than about 1% of a wavelength of a signal of interest to be measured by the particle motion sensors.

12. The system of claim 1, wherein a spacing between a pair of the particle motion sensors is less than about 50 centimeters.

13. The system of claim 1, wherein a spacing between a pair of the particle motion sensors is between about 5 centimeters and about 30 centimeters.

14. The system of claim 1, wherein a spacing between a first pair of the particle motion sensors is less than about 10% of a wavelength of a signal of interest to be measured by the particle motion sensors, and a spacing between a second pair of the particle motion sensors is less than about 10% of the wavelength of the signal of interest.

15. The system of claim 1, wherein a spacing between a first pair of the particle motion sensors is less than about 1% of a wavelength of a signal of interest to be measured by the particle motion sensors, and a spacing between a second pair of the particle motion sensors is less than about 1% of the wavelength of the signal of interest.

16. A method comprising:
arranging sensor devices at an earth surface, wherein a given one of the sensor devices comprises:
a support structure providing a surface; and
at least three particle motion sensors arranged on the support structure to measure translational data in a first direction, the particle motion sensors having a triangular arrangement that enables calculation of spatial gradients of the translational data in a second direction and a third direction both of which are perpendicular to the first direction and to each other;
propagating seismic waves into an earth subsurface;
measuring particle motion data of reflected seismic waves with the particle motion sensors, said particle motion data being translational data in a first direction; and
calculating from the translational data measured by the at least three particle motion sensors spatial gradients of the translational data in second and third directions both of which are perpendicular to the first direction and to each other.

* * * * *